US012293610B2

United States Patent
Geraghty et al.

(10) Patent No.: US 12,293,610 B2
(45) Date of Patent: May 6, 2025

(54) VIRTUAL QUEUE SYSTEM AND METHOD

(71) Applicant: Universal City Studios LLC, Universal City, CA (US)

(72) Inventors: Thomas Geraghty, Orlando, FL (US); Justin Michael Schwartz, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/140,397

(22) Filed: Apr. 27, 2023

(65) Prior Publication Data
US 2023/0260353 A1   Aug. 17, 2023

Related U.S. Application Data

(63) Continuation of application No. 17/505,887, filed on Oct. 20, 2021, now Pat. No. 11,670,126, which is a
(Continued)

(51) Int. Cl.
*H04W 4/80* (2018.01)
*G06K 7/10* (2006.01)
(Continued)

(52) U.S. Cl.
CPC .......... *G07C 11/00* (2013.01); *G06K 7/10297* (2013.01); *G06K 7/10366* (2013.01);
(Continued)

(58) Field of Classification Search
CPC ..... G07C 11/00; H04W 4/80; G06K 7/10297; G06K 7/10366; H04B 1/385; H04B 5/0062; G06F 3/147
(Continued)

(56) References Cited

U.S. PATENT DOCUMENTS 5,502,806 A   3/1996   Mahoney et al.
5,566,327 A   10/1996   Sehr
(Continued)

FOREIGN PATENT DOCUMENTS

CN   101498586 A   8/2009
CN   101833698 A   9/2010
(Continued)

OTHER PUBLICATIONS

International Search Report and Written Opinion in corresponding PCT Application No. PCT/US2015/045897 mailed Nov. 11, 2015 (11 pages).
(Continued)

*Primary Examiner* — April G Gonzales
(74) *Attorney, Agent, or Firm* — Fletcher Yoder, PC (57) ABSTRACT

A system in accordance with present embodiments includes a plurality of wearable devices and a virtual queue control system configured to maintain respective virtual queues for respective attractions and in communication with the plurality of virtual queuing attraction stations. The virtual queue control system is configured to receive communications from the plurality of virtual queuing stations and add guests to the respective virtual queues based on the communications.

20 Claims, 3 Drawing Sheets

Related U.S. Application Data continuation of application No. 16/806,557, filed on Mar. 2, 2020, now Pat. No. 11,182,998, which is a continuation of application No. 16/210,982, filed on Dec. 5, 2018, now Pat. No. 10,580,244, which is a continuation of application No. 15/460,010, filed on Mar. 15, 2017, now Pat. No. 10,152,840.

(60) Provisional application No. 62/309,306, filed on Mar. 16, 2016.

(51) Int. Cl.
*G07C 11/00* (2006.01)
*H04B 1/3827* (2015.01)
*H04B 5/77* (2024.01)
*G06F 3/147* (2006.01)

(52) U.S. Cl.
CPC ............ *H04B 1/385* (2013.01); *H04B 5/77* (2024.01); *H04W 4/80* (2018.02); *G06F 3/147* (2013.01); *G07C 2011/02* (2013.01); *G07C 2011/04* (2013.01); *G09G 2380/04* (2013.01); *H04B 2001/3861* (2013.01)

(58) Field of Classification Search
USPC ...................................................... 455/41.1
See application file for complete search history.

(56) References Cited

U.S. PATENT DOCUMENTS

| | | | |
|---|---|---|---|
| 5,694,514 A | 12/1997 | Evans et al. | |
| 5,946,444 A | 8/1999 | Evans et al. | |
| 5,978,770 A | 11/1999 | Waytena et al. | |
| 5,987,420 A | 11/1999 | Maeda et al. | |
| 5,987,421 A | 11/1999 | Chuang | |
| 6,078,928 A | 6/2000 | Schnase et al. | |
| 6,142,368 A | 11/2000 | Mullins et al. | |
| 6,173,209 B1 | 1/2001 | Laval et al. | |
| 6,259,786 B1 | 7/2001 | Gisby | |
| 6,307,952 B1 | 10/2001 | Dietz | |
| 6,424,623 B1 | 7/2002 | Borgstahl et al. | |
| 6,526,158 B1 | 2/2003 | Goldberg | |
| 6,529,786 B1 * | 3/2003 | Sim ..................... | G06Q 10/025 705/5 |
| 6,535,376 B2 | 3/2003 | Fujita et al. | |
| 6,629,019 B2 | 9/2003 | Legge et al. | |
| 6,748,364 B1 * | 6/2004 | Waytena ............. | G06Q 10/087 705/5 |
| 6,785,539 B2 | 8/2004 | Hale et al. | |
| 6,813,608 B1 | 11/2004 | Baranowski | |
| 6,819,759 B1 | 11/2004 | Khuc et al. | |
| 6,845,361 B1 | 1/2005 | Dowling | |
| 6,873,260 B2 | 3/2005 | Lancos et al. | |
| 6,889,098 B1 | 5/2005 | Laval et al. | |
| 6,889,900 B2 | 5/2005 | Davies et al. | |
| 6,937,998 B1 | 8/2005 | Swartz et al. | |
| 7,029,400 B2 | 4/2006 | Briggs | |
| 7,046,790 B2 * | 5/2006 | Holmen ................. | G07C 11/00 379/265.09 |
| 7,047,205 B2 | 5/2006 | Hale et al. | |
| 7,136,822 B2 | 11/2006 | Kimura et al. | |
| 7,188,767 B2 | 3/2007 | Penuela et al. | |
| 7,204,425 B2 | 4/2007 | Mosher, Jr. et al. | |
| 7,212,983 B2 | 5/2007 | Redmann et | |
| 7,222,080 B2 | 5/2007 | Hale et al. | |
| 7,224,967 B2 | 5/2007 | Hale et al. | |
| 7,327,251 B2 | 2/2008 | Corbett, Jr. | |
| 7,366,512 B1 | 4/2008 | Kefalas et al. | |
| 7,400,932 B2 | 7/2008 | Ackley et al. | |
| 7,430,411 B2 | 9/2008 | Sengupta et al. | |
| 7,486,648 B1 * | 2/2009 | Baranowski .......... | H04W 88/08 370/252 |
| 7,496,445 B2 | 2/2009 | Mohsini et al. | |
| 7,505,474 B2 | 3/2009 | Walter | |
| 7,516,148 B2 * | 4/2009 | Waytena ................ | G06Q 10/02 707/999.102 |
| 7,532,941 B2 | 5/2009 | Hale et al. | |
| 7,541,926 B2 | 6/2009 | Dugan et al. | |
| 7,603,321 B2 | 10/2009 | Gurvey | |
| 7,642,921 B2 | 1/2010 | Cutler et al. | |
| 7,674,184 B2 | 3/2010 | Briggs et al. | |
| 7,685,009 B2 | 3/2010 | Halavais et al. | |
| 7,685,014 B2 | 3/2010 | Dean | |
| 7,706,904 B2 | 4/2010 | Jones et al. | |
| 7,720,718 B2 | 5/2010 | Hale et al. | |
| 7,729,382 B2 | 6/2010 | Rosner et al. | |
| 7,739,925 B2 | 6/2010 | Foster | |
| 7,752,146 B2 | 7/2010 | Lert, Jr. | |
| 7,756,745 B2 | 7/2010 | Leet et al. | |
| 7,775,894 B2 | 8/2010 | Henry et al. | |
| 7,778,937 B2 | 8/2010 | Ferrara et al. | |
| 7,787,965 B2 | 8/2010 | Hale et al. | |
| 7,788,215 B2 | 8/2010 | Trowbridge et al. | |
| 7,793,109 B2 | 9/2010 | Ortiz | |
| 7,801,629 B2 | 9/2010 | Hale et al. | |
| 7,801,752 B2 | 9/2010 | Neulight | |
| 7,802,724 B1 | 9/2010 | Nohr | |
| 7,817,990 B2 | 10/2010 | Pamminger et al. | |
| 7,826,966 B2 | 11/2010 | Little et al. | |
| 7,837,567 B2 | 11/2010 | Holzberg et al. | |
| 7,881,713 B2 | 2/2011 | Hale et al. | |
| 7,885,763 B2 | 2/2011 | Havens | |
| 7,895,066 B2 * | 2/2011 | Waytena .............. | G06Q 10/087 705/5 |
| 7,921,297 B2 | 4/2011 | Ortiz et al. | |
| 7,942,320 B2 | 5/2011 | Joe | |
| 7,966,215 B1 | 6/2011 | Myers et al. | |
| 7,994,910 B2 | 8/2011 | Brooks et al. | |
| 8,016,667 B2 | 9/2011 | Benbrahim | |
| 8,082,165 B2 | 12/2011 | Natsuyama et al. | |
| 8,126,782 B1 | 2/2012 | Zhu et al. | |
| 8,200,515 B2 | 6/2012 | Natsuyama et al. | |
| 8,226,493 B2 | 7/2012 | Briggs et al. | |
| 8,231,047 B2 | 7/2012 | Canora | |
| 8,239,231 B2 * | 8/2012 | Lian .................. | G06Q 30/016 705/7.12 |
| 8,253,533 B2 | 8/2012 | Jones | |
| 8,253,542 B2 | 8/2012 | Canora et al. | |
| 8,275,767 B2 | 9/2012 | Shepherd et al. | |
| 8,284,924 B2 | 10/2012 | Dube et al. | |
| 8,294,549 B2 | 10/2012 | Samovar et al. | |
| 8,296,983 B2 | 10/2012 | Padgett et al. | |
| 8,313,381 B2 | 11/2012 | Ackley et al. | |
| 8,330,587 B2 | 12/2012 | Kupstas | |
| 8,333,321 B2 | 12/2012 | Gressel et al. | |
| 8,396,001 B2 | 3/2013 | Jung et al. | |
| 8,396,727 B2 * | 3/2013 | Waytena ................ | G06Q 10/02 705/5 |
| 8,401,334 B2 | 3/2013 | Neville et al. | |
| 8,416,087 B2 | 4/2013 | Canora et al. | |
| 8,424,716 B2 | 4/2013 | Hegan et al. | |
| 8,425,314 B2 | 4/2013 | Benbrahim | |
| 8,430,749 B2 | 4/2013 | Nelson et al. | |
| 8,452,708 B1 | 5/2013 | Birenbaum et al. | |
| 8,453,926 B2 | 6/2013 | Hunt | |
| 8,462,994 B2 | 6/2013 | Ortiz et al. | |
| 8,489,451 B2 | 7/2013 | Ramchandani | |
| 8,489,657 B2 | 7/2013 | Shepherd et al. | |
| 8,498,900 B1 | 7/2013 | Spirin et al. | |
| 8,500,031 B2 | 8/2013 | Naelon | |
| 8,510,136 B2 | 8/2013 | Charania et al. | |
| 8,510,163 B2 | 8/2013 | Hess et al. | |
| 8,565,735 B2 | 10/2013 | Wohlwend et al. | |
| 8,577,734 B2 | 11/2013 | Treyz et al. | |
| 8,581,721 B2 | 11/2013 | Asher et al. | |
| 8,606,605 B2 * | 12/2013 | Bayne ................... | G06Q 10/02 705/5 |
| 8,608,548 B2 | 12/2013 | Mattice et al. | |
| 8,612,278 B1 | 12/2013 | Ashley, Jr. et al. | |
| 8,616,984 B2 | 12/2013 | Mattice et al. | |
| 8,618,935 B2 | 12/2013 | Felt et al. | |
| 8,654,965 B2 | 2/2014 | Dube et al. | |

(56) References Cited

U.S. PATENT DOCUMENTS

| | | | |
|---|---|---|---|
| 8,700,005 B1 | 4/2014 | Kiraly et al. | |
| 8,731,997 B2 | 5/2014 | Corbett et al. | |
| 8,732,101 B1 | 5/2014 | Wilson et al. | |
| 8,750,576 B2 | 6/2014 | Huang et al. | |
| 8,750,784 B2 | 6/2014 | Ortiz et al. | |
| 8,751,472 B2 | 6/2014 | Mei et al. | |
| 8,762,101 B2 | 6/2014 | Yuen et al. | |
| 8,773,245 B2 | 7/2014 | Canora et al. | |
| 8,774,839 B2 | 7/2014 | Busch | |
| 8,775,244 B2 | 7/2014 | Boss et al. | |
| 8,779,889 B2* | 7/2014 | Bayne | G07C 9/15 340/5.1 |
| 8,793,314 B2 | 7/2014 | Spivak et al. | |
| 8,798,643 B1 | 8/2014 | Boyle et al. | |
| 8,803,366 B2 | 8/2014 | Proud | |
| 8,810,430 B2 | 8/2014 | Proud | |
| 8,821,238 B2 | 9/2014 | Ackley et al. | |
| 8,827,810 B2 | 9/2014 | Weston et al. | |
| 8,830,030 B2 | 9/2014 | Arthurs et al. | |
| 8,831,963 B2 | 9/2014 | Backer et al. | |
| 8,851,372 B2 | 10/2014 | Zhou et al. | |
| 8,866,673 B2 | 10/2014 | Mendelson | |
| 8,870,641 B2 | 10/2014 | Dabrowskiqqq | |
| 8,879,440 B2 | 11/2014 | Guo et al. | |
| 8,896,485 B2 | 11/2014 | Mendelson | |
| 8,897,808 B2 | 11/2014 | Farris | |
| 8,913,011 B2 | 12/2014 | Barney et al. | |
| 8,924,432 B2 | 12/2014 | Richards et al. | |
| 8,948,541 B2 | 2/2015 | Neville et al. | |
| 8,949,146 B2 | 2/2015 | Fisher | |
| 8,954,091 B1 | 2/2015 | Boyle et al. | |
| 8,972,048 B2 | 3/2015 | Canora et al. | |
| 8,979,646 B2 | 3/2015 | Moser et al. | |
| 8,989,779 B1 | 3/2015 | Centore, III | |
| 9,002,736 B2 | 4/2015 | Wohlwend et al. | |
| 9,064,353 B2* | 6/2015 | McLaughlin | G06Q 10/02 |
| 9,138,650 B2 | 9/2015 | Barney et al. | |
| 9,149,717 B2 | 10/2015 | Barney et al. | |
| 9,162,148 B2 | 10/2015 | Barney et al. | |
| 10,121,170 B2* | 11/2018 | DuLeone | G06Q 30/0281 |
| 10,129,728 B2* | 11/2018 | Sahadi | H04B 1/385 |
| 10,152,840 B2 | 12/2018 | Geraghty et al. | |
| 11,816,758 B2* | 11/2023 | Smith | H04N 21/6587 |
| 2002/0007292 A1* | 1/2002 | Paxton | G07C 11/00 705/6 |
| 2002/0008622 A1* | 1/2002 | Weston | G06F 16/58 340/572.1 |
| 2002/0046068 A1 | 4/2002 | Koh | |
| 2002/0070865 A1 | 6/2002 | Lancos et al. | |
| 2002/0082897 A1 | 6/2002 | Menelly et al. | |
| 2002/0099576 A1 | 7/2002 | MacDonald et al. | |
| 2002/0116233 A1 | 8/2002 | Kuge et al. | |
| 2002/0116235 A1 | 8/2002 | Grimm et al. | |
| 2002/0174003 A1 | 11/2002 | Redmann et al. | |
| 2003/0030561 A1 | 2/2003 | Yafuso et al. | |
| 2003/0041105 A1 | 2/2003 | Patrick | |
| 2003/0093167 A1 | 5/2003 | Sim | |
| 2003/0102956 A1 | 6/2003 | McManus et al. | |
| 2003/0195760 A1 | 10/2003 | Kim et al. | |
| 2004/0006497 A1 | 1/2004 | Nestor et al. | |
| 2004/0059614 A1 | 3/2004 | Brown et al. | |
| 2004/0100390 A1 | 5/2004 | Giraldin et al. | |
| 2004/0117219 A1 | 6/2004 | Sugimoto et al. | |
| 2004/0117528 A1 | 6/2004 | Beacher et al. | |
| 2004/0158482 A1 | 8/2004 | Hale et al. | |
| 2004/0172315 A1* | 9/2004 | Hale | G06Q 10/02 705/5 |
| 2004/0172316 A1 | 9/2004 | Hale et al. | |
| 2004/0181424 A1 | 9/2004 | Hale et al. | |
| 2004/0225540 A1 | 11/2004 | Waytena et al. | |
| 2005/0045710 A1 | 3/2005 | Burke | |
| 2005/0060173 A1 | 3/2005 | Hale et al. | |
| 2005/0070258 A1 | 3/2005 | Stanco | |
| 2005/0080675 A1 | 4/2005 | Lovegreen et al. | |
| 2005/0168340 A1 | 8/2005 | Mosher, Jr. et al. | |
| 2005/0198107 A1 | 9/2005 | Cuhls et al. | |
| 2005/0200455 A1 | 9/2005 | Veni, III et al. | |
| 2005/0240453 A1 | 10/2005 | Lyons | |
| 2005/0278215 A1 | 12/2005 | Seele, Jr. | |
| 2006/0002413 A1 | 1/2006 | Tsutazawa et al. | |
| 2006/0068787 A1 | 3/2006 | Deshpande et al. | |
| 2006/0076402 A1* | 4/2006 | Lerch | G06Q 20/40 235/380 |
| 2006/0100985 A1 | 5/2006 | Mark et al. | |
| 2006/0147005 A1 | 7/2006 | Taub | |
| 2006/0273920 A1 | 12/2006 | Doan et al. | |
| 2007/0008131 A1* | 1/2007 | Doan | G06K 17/0029 340/572.1 |
| 2007/0042748 A1 | 2/2007 | Macarthur | |
| 2007/0064904 A1 | 3/2007 | Wesley | |
| 2007/0088701 A1 | 4/2007 | Rao | |
| 2007/0130313 A1 | 6/2007 | King | |
| 2007/0156846 A1 | 7/2007 | Seward | |
| 2007/0168390 A1 | 7/2007 | Mardirossian | |
| 2007/0174042 A1 | 7/2007 | Thompson | |
| 2007/0178912 A1* | 8/2007 | Baranowski | G06Q 30/02 455/456.2 |
| 2007/0203763 A1 | 8/2007 | Ackley et al. | |
| 2007/0225911 A1 | 9/2007 | Chanick | |
| 2007/0233291 A1 | 10/2007 | Herde et al. | |
| 2007/0244731 A1 | 10/2007 | Barhydt et al. | |
| 2007/0286220 A1* | 12/2007 | Stenning | G07C 11/00 370/412 |
| 2008/0022089 A1 | 1/2008 | Leedom | |
| 2008/0040172 A1 | 2/2008 | Watkins | |
| 2008/0055051 A1 | 3/2008 | Snyder et al. | |
| 2008/0071587 A1 | 3/2008 | Granucci et al. | |
| 2008/0080445 A1 | 4/2008 | Bayne et al. | |
| 2008/0086377 A1 | 4/2008 | Jain | |
| 2008/0129487 A1 | 6/2008 | Crucs | |
| 2008/0133283 A1 | 6/2008 | Backer et al. | |
| 2008/0197984 A1 | 8/2008 | Peters et al. | |
| 2008/0201227 A1 | 8/2008 | Bakewell et al. | |
| 2008/0215385 A1 | 9/2008 | Veitch | |
| 2008/0220871 A1 | 9/2008 | Asher et al. | |
| 2008/0246592 A1 | 10/2008 | Waalkes et al. | |
| 2008/0251575 A1* | 10/2008 | Bowling | H04N 5/77 235/375 |
| 2008/0267107 A1 | 10/2008 | Rosenberg | |
| 2008/0270230 A1 | 10/2008 | Hendrickson et al. | |
| 2008/0270305 A1 | 10/2008 | Andreasson et al. | |
| 2008/0275630 A1 | 11/2008 | Regienczuk | |
| 2008/0301264 A1 | 12/2008 | Mathai et al. | |
| 2008/0319935 A1 | 12/2008 | Chandak | |
| 2008/0319992 A1 | 12/2008 | Mathai et al. | |
| 2009/0063205 A1 | 3/2009 | Shibasaki | |
| 2009/0104874 A1 | 4/2009 | Ellis | |
| 2009/0112638 A1 | 4/2009 | Kneller et al. | |
| 2009/0116235 A1 | 5/2009 | Tsao et al. | |
| 2009/0204449 A1 | 8/2009 | Waytena et al. | |
| 2009/0216547 A1 | 8/2009 | Canora et al. | |
| 2009/0219169 A1 | 9/2009 | Herwats | |
| 2009/0222291 A1 | 9/2009 | Montavon et al. | |
| 2009/0259556 A1 | 10/2009 | Carroll et al. | |
| 2009/0267728 A1 | 10/2009 | Mayrand | |
| 2009/0276341 A1 | 11/2009 | McMahan et al. | |
| 2009/0281903 A1 | 11/2009 | Blatstein | |
| 2009/0286559 A1 | 11/2009 | Janas et al. | |
| 2009/0313062 A1 | 12/2009 | Natsuyama et al. | |
| 2009/0319306 A1 | 12/2009 | Chanick | |
| 2010/0017238 A1 | 1/2010 | Johnson | |
| 2010/0017725 A1 | 1/2010 | McCarthy et al. | |
| 2010/0062838 A1 | 3/2010 | Nguyen et al. | |
| 2010/0063854 A1 | 3/2010 | Purvis et al. | |
| 2010/0070312 A1* | 3/2010 | Hunt | G06Q 50/265 235/494 |
| 2010/0111377 A1 | 5/2010 | Monroe | |
| 2010/0114968 A1 | 5/2010 | Dean | |
| 2010/0117790 A1* | 5/2010 | Bayne | G07C 9/28 340/5.21 |
| 2010/0131366 A1* | 5/2010 | Gibson | G06Q 30/06 705/14.58 |
| 2010/0161432 A1 | 6/2010 | Kumanov et al. | |

(56) References Cited

U.S. PATENT DOCUMENTS

| | | |
|---|---|---|
| 2010/0250612 A1 | 9/2010 | Reuveni et al. |
| 2010/0262507 A1 | 10/2010 | Woycik et al. |
| 2010/0277276 A1* | 11/2010 | Bayne ................ G07C 9/27 340/5.21 |
| 2010/0308964 A1 | 12/2010 | Ackley et al. |
| 2010/0317377 A1 | 12/2010 | Zou et al. |
| 2010/0320268 A1* | 12/2010 | Brooks ................ G06Q 30/00 235/382 |
| 2010/0321149 A1 | 12/2010 | Foster |
| 2010/0328025 A1 | 12/2010 | Razdan |
| 2011/0022425 A1 | 1/2011 | Block et al. |
| 2011/0040655 A1 | 2/2011 | Hendrickson |
| 2011/0133892 A1 | 6/2011 | Nohr |
| 2011/0178960 A1 | 7/2011 | Dever et al. |
| 2011/0227726 A1 | 9/2011 | Lee |
| 2011/0307547 A1 | 12/2011 | Backer et al. |
| 2011/0320243 A1 | 12/2011 | Khan |
| 2012/0013462 A1 | 1/2012 | Tuck et al. |
| 2012/0016745 A1 | 1/2012 | Hendrickson |
| 2012/0040751 A1 | 2/2012 | Peters |
| 2012/0116789 A1 | 5/2012 | Boss et al. |
| 2012/0116863 A1 | 5/2012 | Boss et al. |
| 2012/0136793 A1 | 5/2012 | Barber-Mingo et al. |
| 2012/0147169 A1 | 6/2012 | Harper et al. |
| 2012/0162436 A1* | 6/2012 | Cordell ............ H04N 21/23109 348/158 |
| 2012/0184367 A1 | 7/2012 | Parrott et al. |
| 2012/0197746 A1 | 8/2012 | Harris |
| 2012/0197949 A1 | 8/2012 | Taylor et al. |
| 2012/0223834 A1 | 9/2012 | Hyatt |
| 2012/0265671 A1* | 10/2012 | Higgins ................ H04L 9/3213 705/1.1 |
| 2012/0271834 A1 | 10/2012 | Canora et al. |
| 2012/0287281 A1 | 11/2012 | Williams et al. |
| 2012/0323646 A1 | 12/2012 | Dube et al. |
| 2012/0330740 A1 | 12/2012 | Pennington et al. |
| 2013/0018661 A1 | 1/2013 | Padgett et al. |
| 2013/0018684 A1 | 1/2013 | Padgett et al. |
| 2013/0041696 A1 | 2/2013 | Richard |
| 2013/0045804 A1 | 2/2013 | Ruke |
| 2013/0065679 A1 | 3/2013 | Gelman et al. |
| 2013/0066660 A1 | 3/2013 | Kopitzke et al. |
| 2013/0073325 A1 | 3/2013 | Ross |
| 2013/0090957 A1 | 4/2013 | Popkey et al. |
| 2013/0091146 A1 | 4/2013 | Stanger |
| 2013/0102248 A1 | 4/2013 | Jay et al. |
| 2013/0103519 A1 | 4/2013 | Kountotsis et al. |
| 2013/0124234 A1 | 5/2013 | Nilsson et al. |
| 2013/0146659 A1 | 6/2013 | Zhou et al. |
| 2013/0151296 A1 | 6/2013 | Waytena et al. |
| 2013/0165154 A1 | 6/2013 | Joshi |
| 2013/0204651 A1 | 8/2013 | Gulec et al. |
| 2013/0204656 A1 | 8/2013 | Mahfouda et al. |
| 2013/0218612 A1 | 8/2013 | Hunt |
| 2013/0254027 A1 | 9/2013 | Silverman et al. |
| 2013/0254137 A1 | 9/2013 | Hunt |
| 2013/0293720 A1 | 11/2013 | Tyson et al. |
| 2013/0332208 A1 | 12/2013 | Mehta |
| 2013/0332509 A1 | 12/2013 | Schwartz et al. |
| 2014/0006451 A1 | 1/2014 | Mullis et al. |
| 2014/0046802 A1 | 2/2014 | Hosein et al. |
| 2014/0067441 A1* | 3/2014 | Bayne ................ G06Q 10/02 705/5 |
| 2014/0074404 A1 | 3/2014 | Hassan |
| 2014/0074523 A1 | 3/2014 | Turner et al. |
| 2014/0089075 A1 | 3/2014 | Sanchis et al. |
| 2014/0108149 A1 | 4/2014 | Jabara et al. |
| 2014/0113707 A1 | 4/2014 | Asher et al. |
| 2014/0114807 A1 | 4/2014 | Baker et al. |
| 2014/0132400 A1 | 5/2014 | Heaven et al. |
| 2014/0136105 A1 | 5/2014 | Chakraborty et al. |
| 2014/0156290 A1 | 6/2014 | Kozicki et al. |
| 2014/0156319 A1 | 6/2014 | Deeb |
| 2014/0162693 A1 | 6/2014 | Wachter et al. |
| 2014/0235276 A1 | 8/2014 | Lefkowitz |
| 2014/0236653 A1 | 8/2014 | Farrell |
| 2014/0249866 A1 | 9/2014 | Popkey et al. |
| 2014/0249994 A1 | 9/2014 | Proud |
| 2014/0256421 A1 | 9/2014 | Bishop et al. |
| 2014/0256446 A1 | 9/2014 | Barney et al. |
| 2014/0257889 A1 | 9/2014 | Ashley, Jr. et al. |
| 2014/0278688 A1 | 9/2014 | Sullivan et al. |
| 2014/0324488 A1 | 10/2014 | Boccelli |
| 2014/0343976 A1 | 11/2014 | Ahluwalia et al. |
| 2014/0343977 A1 | 11/2014 | Macina |
| 2014/0343995 A1 | 11/2014 | Backer et al. |
| 2014/0364148 A1 | 12/2014 | Block et al. |
| 2014/0378233 A1 | 12/2014 | Weston et al. |
| 2015/0009116 A1 | 1/2015 | Mangold et al. |
| 2015/0025919 A1 | 1/2015 | West |
| 2015/0026008 A1 | 1/2015 | Werbitt |
| 2015/0046202 A1 | 2/2015 | Hunt |
| 2015/0058129 A1 | 2/2015 | Nevid et al. |
| 2015/0058324 A1 | 2/2015 | Kauwe |
| 2015/0080081 A1 | 3/2015 | Kessman et al. |
| 2015/0081348 A1 | 3/2015 | Avera et al. |
| 2015/0083803 A1 | 3/2015 | Herron et al. |
| 2015/0088562 A1 | 3/2015 | Woods |
| 2015/0088671 A1 | 3/2015 | Xiong et al. |
| 2015/0088782 A1 | 3/2015 | Zhang |
| 2015/0090242 A1 | 4/2015 | Weston et al. |
| 2015/0193997 A1* | 7/2015 | Butler ................ G07C 9/20 340/5.6 |
| 2016/0055429 A1* | 2/2016 | Schwartz ................ G06Q 10/02 |
| 2016/0092797 A1* | 3/2016 | Clarke ................ G06Q 10/02 705/5 |
| 2016/0180412 A1* | 6/2016 | DuLeone ............ G06Q 30/0281 705/346 |
| 2017/0032288 A1* | 2/2017 | Popkey ................ G06Q 10/063 |
| 2017/0098337 A1* | 4/2017 | Galley ................ G07C 9/215 |
| 2017/0161670 A1 | 6/2017 | Ng et al. |
| 2017/0270734 A1* | 9/2017 | Geraghty ................ H04W 4/80 |
| 2018/0129984 A1* | 5/2018 | Polk ................ G06Q 10/06311 |
| 2018/0165904 A1* | 6/2018 | Setchell ................ H04N 23/90 |
| 2018/0240151 A1* | 8/2018 | D'Andrea ............ G06Q 30/0252 |
| 2018/0240161 A1* | 8/2018 | Cronin ................ G06Q 30/0281 |
| 2018/0290687 A1 | 10/2018 | Douglas et al. |
| 2018/0365600 A1* | 12/2018 | Carrier ................ G07C 11/00 |
| 2019/0043281 A1 | 2/2019 | Aman |
| 2019/0139104 A1* | 5/2019 | Hanley ................ G07C 9/20 |
| 2019/0164177 A1* | 5/2019 | Yeh ................ G06Q 30/0201 |
| 2019/0272695 A1 | 9/2019 | Schwartz et al. |
| 2019/0347885 A1 | 11/2019 | Galley et al. |
| 2019/0347911 A1* | 11/2019 | Linguanti ........ G06Q 10/06398 |
| 2020/0114510 A1 | 4/2020 | Berry et al. |
| 2020/0160648 A1 | 5/2020 | Froy |
| 2020/0273048 A1 | 8/2020 | Andon et al. |
| 2021/0016185 A1 | 1/2021 | Linguanti et al. |
| 2021/0150421 A1* | 5/2021 | Abbe ................ G06F 9/44521 |
| 2022/0245574 A1* | 8/2022 | Cella ................ G06Q 10/087 |
| 2022/0262184 A1* | 8/2022 | Kwok ................ G07C 11/00 |
| 2023/0172132 A1* | 6/2023 | Concibido ............ A01P 21/00 504/260 |

FOREIGN PATENT DOCUMENTS

| | | |
|---|---|---|
| CN | 201607767 U | 10/2010 |
| EP | 0958553 A1 | 11/1999 |
| EP | 1 690 222 A2 | 8/2006 |
| EP | 1 696 327 A1 | 8/2006 |
| JP | 2002032800 A | 1/2002 |
| JP | 2004178041 A | 6/2004 |
| WO | WO 9718534 A1 | 5/1997 |
| WO | WO 2003034350 A2 | 4/2003 |
| WO | WO 2004047353 A2 | 6/2004 |
| WO | WO 2005038612 A2 | 4/2005 |
| WO | WO 2005038688 A1 | 4/2005 |
| WO | WO 2005124699 A1 | 12/2005 |
| WO | WO2007004047 A2 | 1/2007 |
| WO | WO 2008128583 A1 | 10/2008 |

(56) References Cited

FOREIGN PATENT DOCUMENTS

| WO | WO 2008144283 A1 | 11/2008 |
|----|------------------|---------|
| WO | WO 2010055286 A1 | 5/2010  |
| WO | WO 2010089771 A2 | 8/2010  |

OTHER PUBLICATIONS

International Search Report and Written Opinion in corresponding PCT Application No. PCT/US2013/044785 mailed Apr. 30, 2014 (15 pages).

* cited by examiner

VIRTUAL QUEUE SYSTEM AND METHOD

CROSS-REFERENCE TO RELATED APPLICATIONS

The present application is a continuation of U.S. patent application Ser. No. 17/505,887, entitled "Virtual Queue System and Method," filed on Oct. 20, 2021, which is a continuation of U.S. patent application Ser. No. 16/806,557, entitled "Virtual Queue System and Method," filed on Mar. 2, 2020, which issued on Nov. 23, 2021 as U.S. Pat. No. 11,182,998, which is a continuation of U.S. patent application Ser. No. 16/210,982, entitled "Virtual Queue System and Method," filed on Dec. 5, 2018, which issued on Mar. 3, 2020 as U.S. Pat. No. 10,580,244, which is a continuation of U.S. patent application Ser. No. 15/460,010, entitled "Virtual Queue System and Method," filed on Mar. 15, 2017, which issued on Dec. 11, 2018 as U.S. Pat. No. 10,152,840, and which claims the benefit of U.S. Provisional Application No. 62/309,306, entitled "Virtual Queue System and Method" and filed Mar. 16, 2016, the disclosures of which are incorporated herein by reference for all purposes.

BACKGROUND

The present disclosure relates generally to the field of amusement parks. More specifically, embodiments of the present disclosure relate to methods and equipment utilized to manage amusement park experiences, including queuing for attractions.

Since the early twentieth century, amusement parks have substantially grown in popularity. In order to address this increasing demand, amusement parks have been expanding by adding attractions and space. The addition of attractions (e.g., rides, restaurants, shops, and shows) generally provides an amusement park with additional capacity to handle a larger number of guests. However, the additional attractions also typically provide potential guests with an incentive to visit the amusement park. Thus, while a particular amusement park may add additional capacity, the additional capacity does not always result in an increased ability for guests to participate in park entertainment (e.g., shopping, viewing shows, riding rides) or reduced wait times for attractions. This is because there is often a corresponding increase in attendance. Further, due to operating efficiencies, it is often desirable to limit the availability of attractions during low attendance times. Thus, queuing for attractions, which may limit participation in park activities, is a perennial issue for amusement parks.

While guests have demanded bigger, better, and more elaborate attractions, they also require and expect a positive overall experience. Providing a positive overall experience for amusement park guests entails addressing certain issues related to queuing for attractions. Indeed, it is now recognized that park guests can be deterred from returning to a particular amusement park due to negative experiences with queue waiting times. Further, guests may be prevented from accessing amusement park businesses (e.g., shops) due to time spent waiting in queues. Indeed, in the past, guests have been forced to wait hours in line to experience some of the more popular attractions at an amusement park. Additionally, it is now recognized that park capacity does not always equal guest utilization of that capacity due to individual guest preferences for certain attractions over others. Accordingly, it is now recognized that it is desirable to improve amusement park queuing systems and methods.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a virtual queue system is provided that includes at least one wearable device comprising: a near field communicator; a medium range communicator; a long range communicator; and a display. The virtual queue system also includes a control system storing instructions that, when executed, cause the control system to: assign a user identification associated with the at least one wearable device to a position within a virtual queue for an attraction based on communication with the near field communicator; and communicate to one or both of the medium range communicator and the long range communicator the position assigned to the user identification within the virtual queue. The virtual queue system also includes an attraction station located proximate the attraction and comprising: a station near field communicator configured to validate access to the attraction based on confirmation of the user identification, received from the wearable device via the near field communicator, being associated with the position in the virtual queue corresponding to an entry position of the virtual queue for the attraction; and wherein one or both of the at least one wearable device or the attraction station is configured to generate a notification that the wearable device is associated with a valid access to the attraction.

In accordance with another embodiment, a virtual queue system is provided that includes at least one wearable device comprising: a near field communicator; a medium range communicator; a long range communicator; and a display. The virtual queue system also includes a control system storing instructions that, when executed, cause the control system to: assign a user identification associated with the at least one wearable device to a position within a virtual queue for an attraction based on communication with the near field communicator; and communicate to one or both of the medium range communicator and the long range communicator, the position assigned to the user identification within the virtual queue to cause the wearable device to display a countdown on the display when the position is within a predetermined time from valid entry to the attraction; and an attraction station located proximate the attraction and comprising: a station near field communicator configured to validate access to the attraction based on confirmation of the user identification, received from the wearable device via the near field communicator, being associated with the position in the virtual queue corresponding to an entry position of the virtual queue for the attraction.

In accordance with another embodiment, a virtual queue system is provided that includes at least one wearable device comprising: a near field communicator; a medium range communicator; a long range communicator; and a display. Also included is a virtual queue station comprising a near field communicator that receives a user identification from the near field communicator of the at least one wearable device; and a virtual queue control system configured to receive the user identification, wherein receiving the user identification causes the virtual queue control system to execute instructions to: assign the user identification associated with the at least one wearable device to a position within a virtual queue for an attraction based on communication with the near field communicator; and communicate to one or both of the medium range communicator and the long range communicator the position within the virtual queue assigned to the user identification and positions of other wearable devices associated with the user identification to cause the wearable device to display the position and the wearable devices associated with the user identification.

In accordance with another embodiment, a virtual queue system is provided that includes at least one wearable device comprising: a near field communicator; a medium range communicator; a long range communicator; and a display. Also included is a control system storing instructions that, when executed, cause the control system to: assign a user identification associated with the at least one wearable device to a position within a virtual queue for an attraction based on communication with the near field communicator; and communicate to one or both of the medium range communicator and the long range communicator the position assigned to the user identification within the virtual queue to the wearable device associated with the user identification; an attraction station located proximate the attraction and comprising: a station near field communicator configured to validate access to the attraction based on confirmation of the user identification, received from the wearable device via the near field communicator, being associated with the position in the virtual queue corresponding to an entry position of the virtual queue for the attraction, wherein one or both of the at least one wearable device or the attraction station is configured to generate a notification that the wearable device is associated with a valid access to the attraction; and an effects station configured to trigger a pre-programmed effect in response to receiving a signal from the near field communicator.

DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Presently disclosed embodiments facilitate virtual queuing within a theme park. A virtual queue control system as provided herein manages queuing for various attractions with the theme park to minimize or eliminate guest time spent waiting in a physical queue. In certain embodiments, a given attraction has a single virtual queue that is dynamically managed by the control system to add or remove guests, update positions in the queue, and send messages to the guests related to their queue positions. The system receives various inputs from the attractions and/or guests that are used to dynamically manage the various queues. In certain embodiments, queuing is mediated via guest devices such as active wearables (e.g., bracelets, wearable tags, necklaces or badges, etc.) that are carried by or associated with the guests and that interact with various kiosks or check-in points to permit guest to enter attraction queues. In this manner, park guests may enjoy the park without carrying paper tickets, identification, or other credentials. For example, guests at a water park may not wish to manage paper tickets that can get wet. Further, because guests wearing bathing suits have limited ability to carry identification items or handheld devices, active wearables that are compatible with water activities (e.g., waterproof) may be a more convenient way to manage queue information than a mobile device.

The present disclosure relates to a virtual queue system for a theme park (e.g., water park), wherein the virtual queue (VQ) system may include an active wearable device such as a wearable virtual queue wristband (which may be customizable with modules and decorative features). In addition, the virtual queue system may be operated in conjunction with software for allocation of or entry to a virtual queue via a "Tap-Point" module and software for ride validation via a "Tap-Point" module and other control system components. In accordance with present embodiments, interconnection (protocols and application program interface (API)) of the virtual queue system and a guest profile system may be customizable to facilitate changing purposes.

Figure 1:
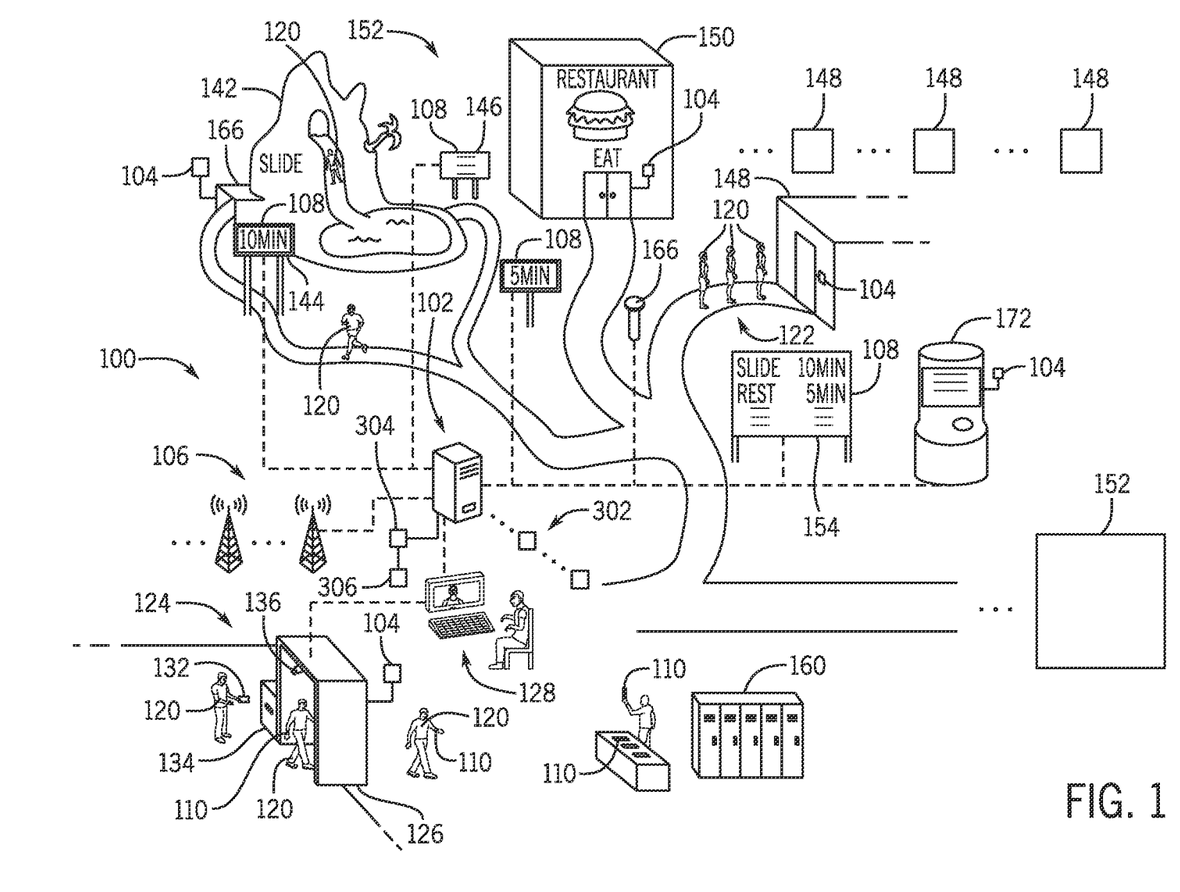
FIG. 1 is a schematic view of a theme park including a virtual queue system in accordance with present techniques.

FIG. 1 is a schematic representation of a system 100 for facilitating queuing in accordance with present embodiments. The system 100 includes a computer system 102, monitoring sensors 104, a wireless communication system 106, system displays 108, active wearables 110 (e.g., a bracelet including accessible data and communication features) and other components that coordinate in accordance with present embodiments, as will be described in detail below. Specifically, it should be noted that present embodiments facilitate virtual queuing such that amusement park guests 120 can obtain a position within a virtual queue and subsequently enter a physical queue or standby loading group 122 of limited length. Present embodiments may function to limit time spent by guests 120 in physically waiting 122 and encourage participation in other areas of an amusement park, such as dining, shopping, and other entertainment venues (e.g., rides, shows). Accordingly, in one embodiment, the attraction queue is mediated entirely via the virtual queue and without physical queues.

When guests 120 arrive at a ticketing location 124 (e.g., hotel front desk, kiosk, guest service counter, park gate), the guests 120 may be provided with entry credentials (e.g., tickets or active wearables 110) among other items, such as a park map, virtual queuing instructions, and amenities instructions. Informational media (e.g., audio, video) and instructional signage may be present at all such ticketing locations 124. In some instances, guests 120 may have obtained entry credentials prior to arrival and may skip acquiring such credentials at the ticketing location 124.

Guests may enter and be provided entry into the park or a park area via an entryway 126. Specifically, as illustrated in FIG. 1, the entryway 126 may exclude a physical turnstile or similar physical traversal counting or control features that can provide an impediment to traversal of the entryway 126 when the entryway 126 is intended to be open. That is, the entryway 126 may be turnstile-less during operation. If guests 120 already have their entry credentials or an identification code or number transferred into an active wearable ("AW") 110, the guests 120 may be provided essentially direct access to the park or park area. For example, guests 120 with properly activated AWs 110 may be allowed to walk through the entryway 126 without stopping. The credentials associated with the AW 110 being held or worn by the guests 120 will be detected and provided to a gate monitoring facility 128 that may be monitored by a park employee (e.g., a security service company). For example, this may include providing a photograph of the guest 120 (e.g., a photograph of the guest's face) passing through the entryway 126. Thus, the photograph may be used for entry privilege confirmation. In other embodiments, other features may be used, such as fingerprints or other identifying aspects (e.g., facial recognition). While certain embodiments of the disclosure are illustrated in conjunction with an AW 110, it should be understood that the disclosed techniques may be implemented with guest-associated devices that are configured to wirelessly communicate guest information, such as pocket-carried devices, handheld devices, or mobile devices. In particular embodiments, the guest-associated devices are waterproof.

If guests 120 do not have their AW 110 with them or if their AW 110 is not properly activated, they may insert ticket media 132 into a scanner 134, which facilitates transfer of information to the gate monitoring facility 128, which may include any of a number of gate monitoring systems, and informs a park employee that the guest 120 is authorized to enter the park or park area. If authorization is granted in this manner, an AW 110 may be distributed to them and a photograph of the guest's face automatically taken. For example, a photograph may be automatically taken by a camera 136 positioned proximate the entryway 126. The same camera 136 may be used for monitoring purposes as well. In other embodiments, the picture of guests 120 acquiring their AW 110 may occur in a different location. Further, in some embodiments, the guests 120 may acquire their AW 110 after progressing through the entryway 126 or prior to progressing through the entryway 126.

Wait times may be ascertained by guests by viewing displays provided at numerous locations throughout the park or park area. At the entrance of certain or all attractions, displays 108 provide the wait time for the specific attraction. For example, the water slide 142 includes a display 144 that specifically provides a wait time for that attraction. The information for each display may be provided based on information obtained by tracking AWs 110 or otherwise monitoring park areas (e.g., ride exits and entrances) with monitoring sensors 104. Further, at the exit of certain or all attractions, a display may be provided to indicate the wait times for all attractions (e.g., all attractions in the park or park area). For example, the exit area of the water slide 142 includes a display 146 that may provide wait times for all of the surrounding attractions (e.g., rides 148). The display 146 may even provide wait times for non-ride attractions, such as a wait time for a restaurant 150. The display 146 may be limited to display of wait times for attractions within a particular park area 152 (e.g., a park "village"). Also, within each park area 152, one or more wait time boards 154 (e.g., centrally located displays 108) may indicate wait times for all park attractions or attractions within the park area 152. Further still, before guests 120 place their portable devices (e.g., mobile phones) into lockers 160, mobile applications may be used via the mobile devices to ascertain wait times.

In one embodiment, the guest 120 enters the queue by walking to the attraction entry and walking through an entry portal. For example, the guest 120 may walk to the water slide 142 and walk through its attraction station 166. Once the guest 120 walks through the portal 166, the guest's AW 110 will notify him/her (e.g., via a tone, vibration, illuminator) of being added to the virtual queue. This may be achieved by detecting the AW 110 with the monitoring sensor 104 at the attraction station 166 and via aspects of the AW 110, which will be discussed further below. In another embodiment, the guest 120 may enter the virtual queue by walking to a queue entry post 168, which may indicate the name of the attraction and current wait time, and engaging the post 168 with the AW 110. This may include tapping the AW 110 against or positioning it near the post 168. The posts 168 may be located at the exit or entry of each attraction and at a central location within each park area 152 or village. In one embodiment, an individual post 168 may be associated with only one attraction such that engaging with the post 168 automatically enters the guest 120 in the virtual queue of the associated attraction, e.g., the virtual queue is entered without any guest selection between different attractions at the post 168, and tapping or engaging the post is the selection step for selecting the associated attraction. In particular embodiments, the queue entry post 168 and/or the attraction station 166, when positioned proximate an attraction, such as at an attraction entrance, may function as an entrance validator for guests already in a virtual queue.

The queue entry post 168 and the attraction station 166 may have similar functionality to one another for adding guests to a virtual queue. In addition, the attraction station 166, when positioned proximate the attraction, such as at the ride entry, may also include functionality for communicating if the guest has a valid entry position to the attraction. Validation may include near field communication with the AW 110 to access the user identification associated with the AW 110 when a guest taps in to the attraction station 166. The user identification is then communicated to a central virtual queue control system remote from the attraction station 166, which in turn accesses the real-time queue position associated with the user identification AW 110, performs rules-based filtering, and provides a validation output of a valid or an invalid position in the virtual queue for attraction entry. For example, in one example of rules-based filtering, when a guest position is at the front of the virtual queue (position 1), the guest is validated for admission. In other embodiments, when the guest position is in a front group (e.g., positions 1-10), the guest is validated for admission. In one embodiment, to encourage guests to return to the attraction for entry, all positions in the virtual queue less than a predetermined number (e.g., 10 or 5) are displayed as position 1 or are displayed on the AW 110 or otherwise indicated as being valid for entry (e.g., tone, vibration, display). In another example, when guests in positions 1-x in the virtual queue are not yet present at the attraction, and the guest is position x+1, the guest is validated. However, the value of x may be defined to be relatively small (10 or less) so that guests are not encouraged to present themselves at an attraction well in advance of gaining an entry position. Validity is indicated to the guest via near field communication to the AW 110 or one or both of a notification on the AW 110 or via a notification on the attraction station 166 (e.g., a tone or display).

Once the guest engages the queue entry post 168, the guest's AW 110 will notify the guest (e.g., via a tone, vibration, illuminator) of being added to the virtual queue. For example, the AW 110 may receive a signal to cause the displayed information on the AW 110 to change. Further, the post 168 may additionally or alternatively provide a notification of successful addition to the queue. The notification may be generated and/or communicated by a central virtual queue control system to the AW 110. In another embodiment, the notification is generated and/or communicated by the queue entry post 168. In yet another embodiment, the guest 120 may enter the virtual queue by walking to a virtual queue station, which may be implemented as a queue kiosk 172 (e.g., a single device that displays the names and wait times for all virtual queuing attractions in the park or park area). Queue kiosks 172 may be located at the entry or exit of each attraction and in a central location within each park area 152. The guest 120 selects the queue he/she wishes to enter and engages (e.g., taps) the kiosk with his/her AW 110. Once the guest 120 engages the queue kiosk 172, the guest's AW 110 will notify the guest 120 (e.g., via a tone, vibration, illuminator) of being added to the virtual queue. For example, the AW 110 may receive a signal to cause the displayed information on the AW 110 to change. Further, the kiosk 172 may additionally or alternatively provide a notification of successful addition to the queue. The notification to the AW 110 may be communicated via a near field communicator of the queue kiosk 172. Alternatively, the notification to the AW 110 may be communicated via a long or medium range communicator and may be communicated from a central control system and not from the queue kiosk 172.

In another embodiment, the guest 120 must physically go the area of a particular attraction and engage with the designated queue entry post 168 (e.g., an attraction station) for that attraction to enter the queue. That is, virtual queue entry is mediated only via the designated queue entry post (or posts) 168 that are physically co-located with the attraction. In this manner, the guest is encouraged to see an individual ride 148 and determine if the ride is of interest before entering the ride virtual queue. The central queue control system receives the communication form the post 168 or kiosk 172 and adds the guest to the appropriate virtual queue. The addition may be based on a time stamp or a counter. For example, for attractions that have multiple tap-in posts 168, the guests may be added based on the individual time stamp of the tap-in event and on a first-in basis.

In each of the embodiments discussed above, the guest's AW 110 may display the estimated return time. For example, a display on the AW 110 may provide a time (e.g., 5:02 PM) by which the guest should return to enter a loading group 122. This time may dynamically change depending on the operational factors (e.g., current ride capacity, other guests leaving the queue, guests with express (e.g., credentials to automatically jump to the front of a physical and/or virtual queue) or very important person (VIP) credentials entering the queue, inclement weather, and/or downtimes). In some embodiments, once the guest 120 has entered a virtual queue (or some limited number of virtual queues), the guest 120 can no longer enter any other virtual queue unless he/she leaves the current virtual queue, either by entering the ride or by entering a different virtual queue. For example, in one embodiment, engaging the post 168 of a ride or attraction overrides any previously existing places in a virtual queue. In this manner, the guest 120 may traverse the park and, upon noting a ride that is of greater interest or that has a shorter wait time, may simply swipe the AW 110 to enter into a new virtual queue and be automatically removed from a previous virtual queue with one action, which permits the guest 120 to minimize engagement with queue devices and enjoy the park experience.

Further, if more than one virtual queue can be entered, the difference between wait times for the available virtual queues may be set to be a sufficient time for both to be entered taking into consideration variables such as travel time between rides or attractions. The system may also artificially space multiple virtual queues to optimize the patrons' day and transit time. In one embodiment, if there is no penalty for failure to arrive at a queued attraction, aside from not being able to enter additional queues, the system may permit close-together times but may also account for a certain predicted percentage of no-shows. In another embodiment, the virtual queuing system may only be in effect if the wait time for the current attraction is greater than 10 minutes. In another embodiment, the guest 120 may be permitted to enter two virtual queues at the same time, but may only enter a single virtual queue at a time that is associated with a ride designated as a low capacity ride. For example, certain park rides may have relatively low capacity and, therefore, may develop longer virtual queues than higher capacity rides, which are capable of moving a greater number of guests through the ride in a given period of time. To control the virtual queue length of lower capacity rides, the virtual queue system as provided herein may, in certain embodiments, prevent the guest 120 from entering two low capacity ride virtual queues simultaneously. For example, when the guest 120 is already entered in a low capacity queue, engaging with the designated post 168 of a second low capacity ride may trigger a warning message displayed on a display of the post 168, e.g., "GUESTS IN LINE FOR DINOSAUR ADVENTURE MAY NOT ENTER THE LINE FOR VOLCANO RUSH. WOULD YOU LIKE TO EXIT THE LINE FOR DINOSAUR ADVENTURE TO JOIN THE LINE FOR VOLCANO RUSH?" The post 168 may then receive a guest selection of YES or NO. If the guest 120 selects no, the engagement with the post 168 of the second low capacity ride is ended. If the guest 120 selects YES, the guest 120 is added to the virtual queue of the second low capacity ride and automatically removed from the virtual queue of the first low capacity ride.

Present embodiments facilitate monitoring or waiting in the virtual queue. Guests 120 may wait in the virtual queue by experiencing instantaneous capacity attractions (e.g., a wave pool, swimming pool, splash pad, lazy river, a ride with no wait time), visiting food, beverage, or merchandising locations, or simply relaxing (e.g., resting in a lounge chair). If an attraction wait time of a virtual queue changes, this information may be provided via the communication system 106 to the AW 110, which will notify the wearing guest 120 and display the updated wait time. If a guest 120 wishes to leave a current virtual queue for another virtual queue, he/she can do so by just joining a new virtual queue as set forth in the description of the various embodiments above. If a guest leaves the park (or, in some cases, a park area) while waiting in a virtual queue, he/she is automatically removed from any virtual queues he/she is currently in. Present embodiments may establish no geographical limits within the park while waiting in a virtual queue and guests 120 may be free to go to any location and perform any task within the park.

Figure 3:
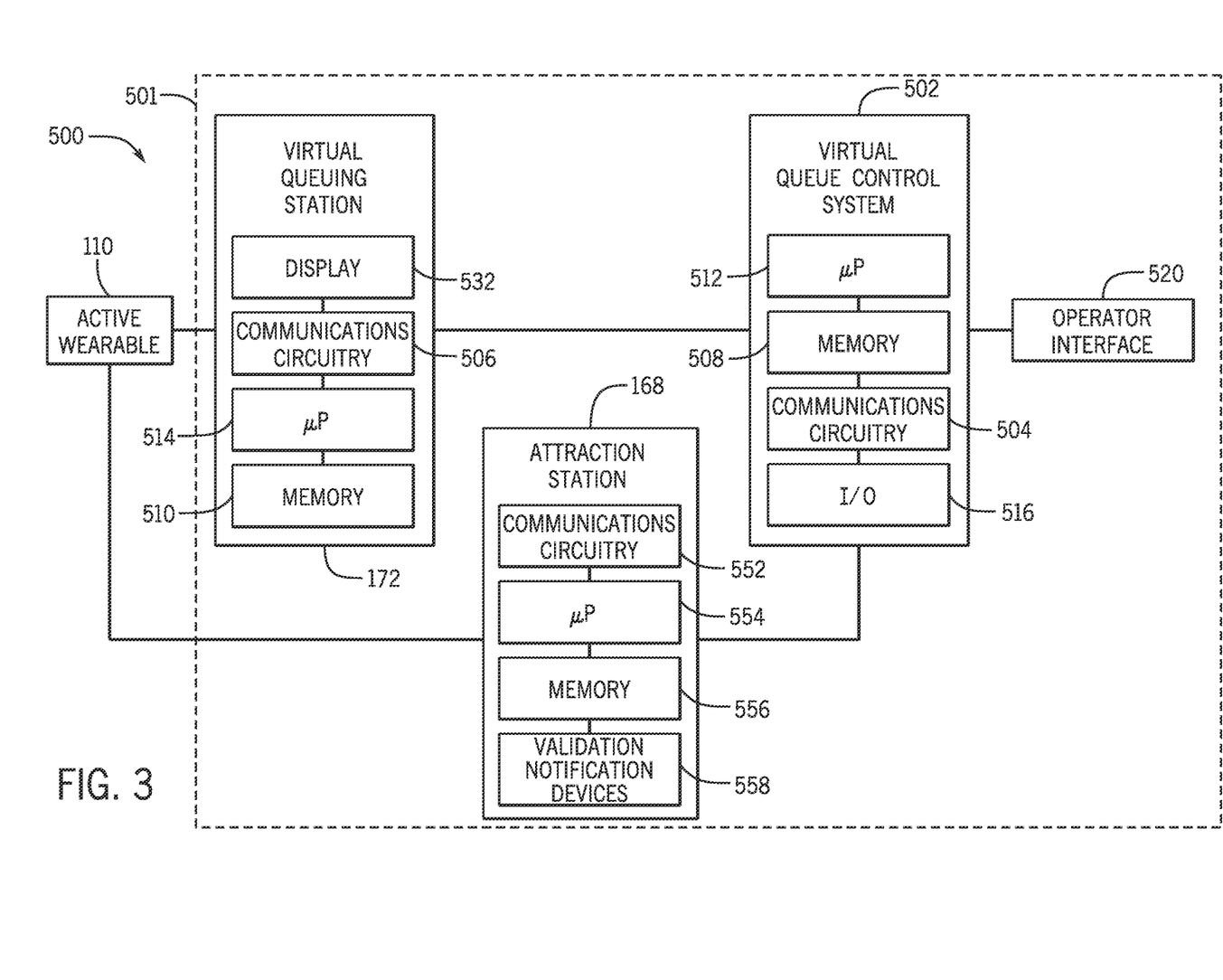
FIG. 3 is a block diagram of a virtual queue system in accordance with present techniques.

Present embodiments encourage initiating and participating in attraction experiences. In some embodiments, the virtual queuing system 100 will notify the guest 120 prior to the guest's ride time. To determine the amount of prior notification time, the system 100 will utilize multiple factors to optimize capacity: current wait time at the attraction, current distance of the guest 120 away from the attraction, the guest's current activity, and the guest's history for arrival speeds from previous virtual queues. Once the guest is notified, the guest 120 travels to the attraction entrance and walks to the load platform, which accommodates the limited standby group 122. These factors or variables are monitored by the computer system 102 (e.g., a network of computers 302), which includes at least one processor 304 and at least one memory 306, via communication with the monitoring sensors 104. To ensure that the attraction throughput is not starved, a small standby group 122 (less than 10 minutes) may be formed prior to the load platform at each attraction. Once a guest reaches the load platform and enters the ride, he/she is removed from the current virtual queue. After experiencing the attraction, guests 120 can join another virtual queue as described above (e.g., a post, kiosk, or the like located in the exit path of the attraction).

Present embodiments also facilitate communication and management of additional data related to park management. For example, the AW 110 may also perform functions other than facilitating queue access. Specifically, the AW 110 may operate as an identification device used for cashless purchases and for validation to access controlled areas. In some embodiments, guest photographs are automatically taken while on each attraction, as triggered by the AW 110. Such photographs can be purchased by the guest 120 via an Internet portal (e.g., website, app, kiosk). Further, information may be automatically logged by the virtual queuing system 100 for data analysis. This information may include: experienced attractions (including count and order of visit), wait time for each attraction, time it takes for the guest to return to the attraction once notified, entry time into the park, exit time out of the park, amount of money spent via cashless system.

In accordance with present embodiments, guests to the theme park shall receive a wearable prior to entering the park (e.g., at the park's front gate) or at least prior to entering a portion of the park. The AW 110 will be linked to the guest's personal profile account on a database and will be configured to interact with kiosks distributed throughout the park. This interaction between the AW 110 and the kiosks will allow the guest to reserve and order items in the park. For example, a guest may reserve VQ slots, cabanas, lockers, towels, etc., using self-serve kiosks, enter and secure lockers and cabanas, and allows guests to purchase food, beverages, and items using the credit card attached to the guest profile in the database. When leaving the park, guests will be prompted to return the wearable; the returned wearable is noted to their account, the payment method is disassociated with the returned wearable, and the device is ready to be cleaned for reuse the next day.

Guests enter virtual queues at the entrances to certain attractions (e.g., rides). Guests secure entry to virtual queues by tapping the wearable at the virtual queue reservation point, kiosk, or ride entry station, which may be positioned at the ride entrances. Once secured, the wearable continues to receive updated information from the park system and wait times are updated and displayed on the guest's wearable. In some embodiments, guests can enter a maximum of two virtual queues and have the virtual queue status displayed on their wearable at any one time. In accordance with present embodiments, attractions in a park may be divided into two classes (e.g., those with a long lead time and those with shorter lead times) and the two VQs a single guest may enter at any one time may be limited to one of each type.

Figure 2:
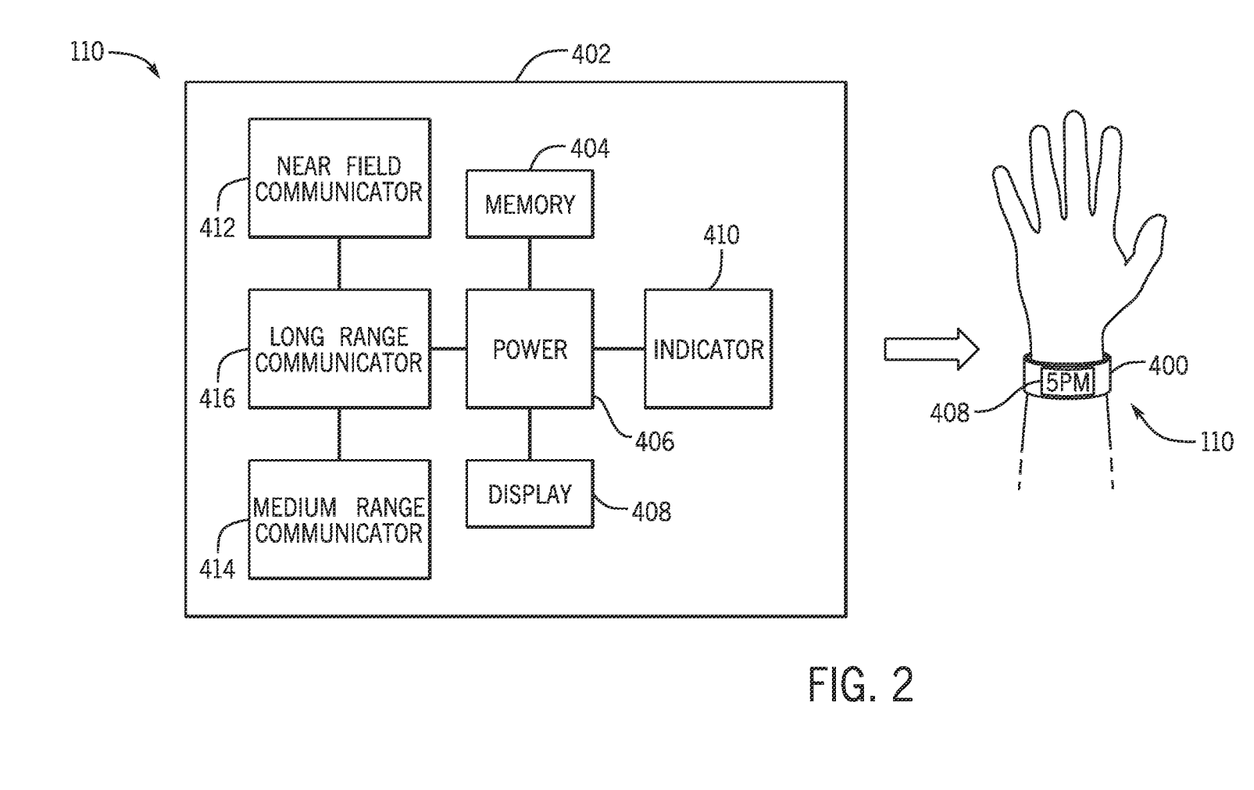
FIG. 2 is a block diagram of an active wearable in accordance with present techniques.

FIG. 2 is a schematic representation of an AW 110 in accordance with present embodiments. In the illustrated embodiment, the AW 110 includes a housing 400 in the form of a bracelet. However, in other embodiments, it may include a necklace, a headband, a ring, or other conveniently wearable item. A device 402 may be imbedded in the housing 400. The device 402 may include several separate or unified components that perform certain functions. In the illustrated embodiment, the device 402 includes a memory/identifier 404, a power module 406, a display 408, an indicator 410, a near field communicator 412, a medium range communicator 414, and a long range communicator 416. In some embodiments, these features may be limited. For example, one or both of the medium range communicator 414, and the long range communicator 416 may be receivers only. In other embodiments, the near field communicator 412, the medium range communicator 414, and the long range communicator 416 are transceivers. Further, the disclosed communicators may implemented as RFID communicators that are active or passive. In some embodiments, the memory/identifier 404 may include a simple identifier (e.g., an RFID tag), which the system 100 associates with a guest 120. In operation, the device 402 may operate to at least receive information from the system 100 to provide the user with information (e.g., a return time for a ride). Further, an indicator (e.g., a light, a vibration mechanism, or an audio feature) may provide feedback to the guest 120. Specifically, the device 402 may communicate with the system 100 via the communication system 106. In some embodiments, this may include communication from the device 402 to the system 100. However, in other embodiments, detecting the device 402 throughout the park area using the monitoring sensors 104 and analyzing such data with the system 100 may provide information related to the device 402 (e.g., wait times experienced by the user 120 associated with the device 402). In some embodiments, the AW 110 may be essentially passive and indications (e.g., confirmation sounds) may be provided by the system 100 (e.g., a speaker announcing a nickname of the wearer being entered into a particular virtual queue).

The AW 110 may be designed as a one-size fits all for average guest ages three (3) years and older. The AW 110 may include components configured to securely and wirelessly communicate, via short, medium and long ranges. For example, the AW 110 may be configured to facilitate communication with software databases (e.g., a database including guest information) and other VQ databases. Guests may be given a wearable, which is connected to VQ and park databases such that the guest's unique guest account can be accessed. The AW 110 may be configured to maintain a secure coupling with a guest, avoid water damage, and so forth when worn all day and riding dynamic body waterslides among other experiences.

The AW 110 is configured for certain functionality based on tapping, e.g., near field communication using a near field communicator 412 to communicate with a corresponding device. In one embodiment, the AW 110 may be configured to have the following functionality: ability to enter a VQ by tapping a VQ entry device (e.g., virtual queue kiosk 172); and ability to validate a guest's VQ allocation by tapping the wearable to a ride validation device (e.g., at an attraction station 166). Additional functionality of the AW 110 may include:

(1) allowing a single tap (e.g., communication with a tap-point, which may include a wireless communication device such as an RFID reader) to associate a wearable with a guest account;

(2) allowing coordination with a tap-point at a kiosk to reserve a cabana, towel, lounge chair, or to access a user's profile;

(3) allowing coordination with a tap-point at a point-of-sale (POS) system to purchase food, beverages or merchandise;

(4) allowing coordination with a tap-point at a kiosk to reserve a locker;

(5) allowing coordination with a tap-point at a locker to open a fixed locker;

(6) allowing coordination with a tap-point at a locker to open a mobile locker;

(7) allowing coordination with a tap-point at a special effects station to trigger pre-programmed effects (e.g., light show, water effects, selfie station); and (8) allowing a medium range reader to coordinate detection of a specific wearable with a database to inform a photo system of a user's identity.

Other functionality may be mediated by medium or long range communication, including:

(1) ability to display current VQ status on the wearable;

(2) ability to receive updated VQ status wirelessly to the wearable;

(3) ability to display a VQ progress indication without wireless signal;

(4) allowing a medium range reader to coordinate detection of a specific wearable with a database to establish location awareness for user heat mapping and tracking; and (5) facilitating provision of alerts and messages displayed on the wearable via wireless signal, near field communication (NFC) and ultra-high frequency (UHF).

The AW 110 may include no connectors. The AW 110 may be configured to wirelessly and securely output an identification (ID) that is connected to the guest account in a park database and a VQ database. The AW 110 may be configured to display information via an electronic display. The AW 110 may be configured to transmit and receive data wirelessly, at approximate distances represented by:

1. Near field: less than five (5) centimeters (two-way proximity)—send/receive via the near field communicator 412;

2. Medium range: up to anywhere between one-half (0.5) and six (6) meters (one-way medium range)—send via the medium range communicator 414; and 3. Long range: up to anywhere between 10 to 100 meters (one way and/or two-way long range, depending upon wireless technology selected) via the long range communicator. In one embodiment, the long range communicator may be a receiver only and may not be capable of two-way communication.

The AW 110 may incorporate a battery powered system configured to provide continuous power to the wearable which exceeds 100 days of 12 hour per day normal guest usage. This requirement represents approximately one (1) year of guest usage. The AW 110 may be configured to communicate at approximately less than five (5) centimeters between wearable to tap point. Latency target associated with this may be less than 100 milliseconds. With respect to two-way proximity communication, the AW 110 may be configured to communicate wirelessly approximately at less than five (5) centimeters between the wearable to tap point. Latency target associated with this may be less than 100 milliseconds. The AW 110 may be configured to send identification information to a tap-point module, and the tap-point module will return with VQ data for a particular attraction (e.g., ride). With respect to medium range (<6 m) wireless communication, the AW 110 may communicate wirelessly at distances of approximately up to one half (0.5) to (6) meters, at speeds up to 10 km/h. With respect to long range (10-100 m) communication, the AW 110 may be configured to communicate wirelessly, at distances approximately up to 10 to 100 meters such that data is received once every ten (10) minutes. With respect to standards and protocols, the AW 110 may be configured to meet ISO 14443 specification requirements for NFC communication. Mifare, DesFire or other functional equivalent tag type compliance with all levels of ISO 14443 specifications with advanced encryption standard (AES) hardware cryptographic engine shall be used for security application. Microcontroller unit (MCU) with AES encryption engine may be used to develop enhanced authentication protocol for two-way proximity and medium range communication. Long range aspects may be configured to support an appropriate security management layer.

The AW 110 may be configured to record and store the latest VQ data received by the software system. For example, the AW 110 may be configured to store information as required by the locker system. The AW 110 may contain active and passive communication devices, which can be tapped on specific tap points within the park to communicate a wearable ID to an associated database. In one embodiment, a total latency from tap point to system response will be <250 milliseconds. The AWs 110 may also be configured to receive dynamic (wireless) updates as well as allow the system to track wearables as they pass through proximity detection portals.

The AW 110 may be configured to receive initial VQ data at a VQ allocation tap-point. Once the data is received from the initial VQ allocation tap-point, the AW 110 may receive dynamic VQ updates at a minimum rate of every ten (10) minutes, or as required to maximize battery capacity while still updating guests on a schedule that is perceived to be relevant by the guests while on the park premises.

The AW 110 may be configured to receive, store, and display information associated with up to two virtual queues (or more). For example, VQ data assigned to other guests associated with a guest may be displayed. VQ data for display on the AW 110 may include:

1. When a new VQ is added; activated at the virtual queue allocation tap-point;

2. When the wearable is activated; and

3. When a VQ time is within 15 minutes of the guest's entry window (e.g., when the guest can ride); and Fifteen (15) minutes prior to the guest's entry window, the AW 110 may start and display a countdown. The countdown may be a numeric countdown (with different time period updates) (1 sec, 1 min, 15 min, etc). The countdown update rate may adjust as the patron's ride time gets closer to the actual time (e.g. 15 min left, the clock updates every 30 seconds instead of every 5 min). The countdown may also be a graphical representation of time remaining (progress bar, hourglass, analog clock) or a color representation of time remaining (Red, Yellow, Green).

The AW 110 may be configured to interact with proximity detection devices which will enable guest location tracking by communicating with walk-through portals located throughout the park. The AW 110 may be configured to interact with proximity detection of a photo system.

The AW 110 may include a display that is readable in direct sunlight. Further, the AW 110 may be configured such that no active cooling is required, to withstand daily cleaning in a dedicated wearable washer subjected to temperatures no greater than 60° Celsius, and to withstand mild detergents (including bleach and/or iodine) for disinfecting. The AW 110 may contain self-testing firmware that cycles through a self-test and indicate that all systems are running properly or indicate that the AW 110 requires service. The AW 110 may include a battery that provides continuous power to the wearable which exceeds 100 days of 12 hours per day of normal guest usage; battery life. This requirement represents approximately one (1) year of guest usage. The AW 110 may be configured such that it has a unit life that exceeds 100 days of normal guest usage, which corresponds to approximately 1 year. The AW 110 may be configured to withstand daily inspection, cleaning, and self-testing. The AW 110 may have no internal serviceable parts. The AW 110 may be configured to function properly between 0° Celsius and 45° Celsius at 100% humidity. The AW 110 may be configured to operate after storage conditions between 0° Celsius and 60° Celsius. The AW 110 may be configured to have a minimum Submersible IP68 rating for:
1. Dust tight; and
2. Immersion in pool water to a depth of one (1) meter for 30 minutes.

The AW 110 may be configured to withstand prolonged one (1) hour exposure to temperatures of 40° Celsius environmental conditions and then be subjected to being submerged into 16° Celsius fresh water for five (5) minutes. The AW 110 may be configured to function properly as designed, with minimal cosmetic impacts, when dropped from a height of three (3) feet onto a flat concrete surface. Further, the AW 110 may be configured to continue to function properly as designed, regardless of cosmetic impact, when dropped from a height of ten (10) feet onto a flat concrete surface. The AW 110 may be configured to exhibit no mechanical defects when exposed to the equivalent of 3,000 hours of full sunlight exposure. This may be confirmed by testing in accordance with ISO 4892 UV Exposure: Plastics—Methods of Exposure to Laboratory Light Sources. The AW 110 may be configured to exhibit minimal discoloration when exposed to the equivalent of 3,000 hours of full sunlight exposure. This may be tested in accordance with ASTM E1347 Standard Practice for Color Analysis. The AW 110 may be configured to not cause skin irritation, rash, discoloration, or other negative effect when worn continuously for 12 hours. The AW 110 may include a wearable/clasp assembly, that maintains a tensile strength between five (5) and thirty (30) pounds per square inch to ensure the wearable remains attached to the guest during normal use, but will break free from the guest without causing injury when caught or snagged on an unintended obstacle. The AW 110 may be configured to continue to function properly, with minimal cosmetic impact, when subjected to a gravitational impact of two (2) Gs. This may be demonstrated by testing in accordance with ASTM D256-10 Standard Test Methods for Determining the Izod Pendulum Impact Resistance of Plastics. The AW 110 may be configured to continue to function properly, with minimal cosmetic impact, when subjected to five (5) hours of vibration at prevention of significant deterioration (PSD) of 0.02, to simulate the vibration of truck delivered shipping. This may be demonstrated by testing in accordance with SAE J1455.

The AW 110 may be configured to exhibit minimal cosmetic damage when exposed to the equivalent of five (5) days or 50 hours of normal guest use in a water park. This may be tested in accordance with ASTM D7027-13, Standard Test Method for Evaluation of Scratch Resistance of Polymeric Coatings and Plastics using an Instrumented Scratch Machine. The display of the AW 110 may be configured to exhibit minimal cosmetic damage when exposed to the equivalent of 5 days or 50 hours of use in a water park. This may be tested in accordance with ASTM F735-11, Standard Test Method for Abrasion Resistance of Transparent Plastics and Coatings Using the Oscillating Sand Method. The AW 110 may be configured to not negatively react mechanically or cosmetically when exposed to the following: fresh water, pool chlorine, soda, blood, sweat, tears, alcohol, vomit, sunscreen, insect repellant, urine, or saliva. The AW 110 may be configured to operate nominally with no adverse effects in a pool water environment with the following water quality conditions:
1. pH—range: 7.3 to 7.8;
2. Chlorine range—range: 1.0 to 10.0;
3. Total alkalinity—range: 70 to 120;
4. Calcium hardness—range: 200 to 400; and
5. Total dissolved solids—average: 1500.

A VQ tap-point, which may be implemented as an attraction station 166, virtual queue post 168, and/or virtual queue kiosk 172, as well as locker rental stations, cabana rental stations, special effects stations etc., may include hardware electrical components that are configured to provide a generic unit to be installed inside of themed enclosures. VQ tap-points may be configured to securely and wirelessly communicate with VQ wearables and other types of radio-frequency identification (RFID)/NFC chips within the HF-ISO 14443 A/B range and may include wired communication to a software database. The VQ tap-point may include a RFID proximity reader, outputs for visual indication of the read LED's within the module, and outputs to connect to the software database. A VQ tap-point may include mounting features (e.g., quick disconnects and outdoor rated plugs) to allow it to be easily replaced with simple hand tools. The VQ tap-point includes features for outward visual indication of successful/unsuccessful tap/notification of exception or error display.

With respect to user experiences with VQ tap-point and VQ wearables, as guests "tap" the module (e.g., establish communication between the AW 110 and the VQ tap-point), the following may occur in certain embodiments:
1. Mode 1: Activate VQ wearable from a standby state upon guest entry to the park;
2. Mode 2: Read VQ wearable to secure a position in the virtual queue;
3. Mode 3: Read VQ wearable to enter the attraction (e.g., ride);
4. Mode 4: Read VQ wearable to check VQ reservation;
5. Mode 5: Read VQ wearable to notify guest of an exception; and
6. Mode 6: Guest is notified on the AW 110, by way of tap, that there has been an exception in their VQ. This could be a ride closure, park closure or overall error.

The VQ tap-point may be configured to receive data two ways: (1) wirelessly from the wearable at distances of less than five centimeter, and (2) via wired Ethernet connection from the software database. The VQ tap-point may contain a main tap point, as well as I/O for a supplemental tap point. Light (or other) outputs may be red, green, blue or white (RGBW) in color and may be mountable into lenses of the themed enclosures. Quantity of lights may be determined based on design of the module, i.e. two (2) eyes in a face theme, and so forth. The VQ tap-point may emit sounds via external speakers between 100 Hz-5 kHz, up to 80 dB, measured at one (1) meter, and may also contain an optional secondary output for a subwoofer. The VQ tap-point may display ride relevant information (e.g., current ride wait time, current time of day and so forth) via, for example, a full color display, and may display guest photos on another separate display; viewable by park team members. In one embodiment, the VQ tap-point may contain a microphone for automatic adjustments to the gain of the loudspeaker. The VQ tap-point may also have a hardwired Ethernet connection to the software system(s).

With respect to two-way proximity communication (distance and latency), the VQ tap-point may communicate at less than five (5) centimeters from a wearable to tap point. Target latency may be less than 100 milliseconds. The VQ tap-point may receive identification data from a VQ wearable, may send that data to the software database to determine VQ time, receive VQ time back from database, and wirelessly communicate the virtual queue time to the AW 110. The wearable ID, VQ location and VQ time may be written to the park database.

With respect to communication with other network systems, the VQ tap-point may communicate with the virtual queue database and other databases (e.g., park databases). ISO 14443 may be used for communication if NFC is the proposed solution. A multiport control unit (MCU) with AES encryption engine, along with 14443A/B NFC transponder, may be used to develop enhanced authentication protocol for two-way proximity. Regarding performance of taps in accordance with present embodiments, guests may tap their VQ wearable to the VQ tap-point hardware to enter virtual queues. Also guests may tap an attraction (e.g., ride) validation module hardware to verify an entitlement when the guest has waited in the virtual queue to physically enter the ride. The VQ tap-point may respond to the tap with appropriate sounds and lights. Total system target latency from tap to system response may be less than or equal to 250 milliseconds.

The VQ tap-point may receive updated VQ times each time a guest taps in. Further, the VQ tap-point may respond in multiple ways:
 1. VQ mode—to indicate success/failure of VQ transaction.
 2. Return mode—to indicate guest availability to ride; time, correct ride, and so forth.

The VQ tap-point may receive updated ride wait times to be displayed every one minute. The VQ tap-point may function properly between 0° Celsius to 45° Celsius, at 100% humidity. The VQ tap-point may survive storage conditions between −10° Celsius to 60° Celsius, at 90% humidity. With respect to ingress protection, the VQ tap-point may be designed as a NEMA Type 4. The VQ tap-point may continue to function properly when dropped from a height of three (3) feet onto a flat concrete surface. Packaging may completely protect the module from any cosmetic or functional defects when a box is dropped from a height of five (5) feet onto a flat concrete surface.

Portions of the VQ tap-point that are subjected to direct or indirect sunlight during normal use may comply with UL 746C. The VQ tap-point may continue to function properly, with minimal cosmetic impact, when subjected to 5 hours of vibration testing at PSD of 0.02; to simulate vibration of trucking/shipping. Testing may be performed in accordance with SAE J1455. The VQ tap-point may be designed such that it does not negatively react, mechanically or cosmetically, when exposed to the following conditions: fresh water, pool chlorine, soda, blood, sweat, tears, alcohol, vomit, sunscreen, insect repellant, urine, or saliva. Electro static discharge compliance of the VQ tap-point may be in accordance with IEC 61000-4-2 ESD Immunity Testing. The VQ tap-point may exhibit no mechanical and minimal cosmetic damage when exposed to the equivalent of 3,000 hours of salt spray exposure. Testing of this may be done in accordance with ASTM B117-11 Standard Practice for Operating Salt Spray (Fog) Apparatus. The VQ tap-point may comply with Restriction of Hazardous Substance Directive 2002/95/EC. Aspects of the VQ tap-point may be easily replaceable and connectable using outdoor rated pluggable connections for the following components:
 1. Displays;
 2. Power;
 3. Speakers;
 4. Network;
 5. Antenna modules; and
 6. Tap.

FIG. 3 is a block diagram of a virtual queue system 500 that may be implemented to manage queues in a theme park. The system 500 includes park devices 501 such as a virtual queue control system 502 in communication with one or more VQ tap-points. While the system is depicted with an embodiment including an attraction station 166 and virtual queuing station 172, it should be understood that these are examples of park devices 501 that are included in the system 500, and that other VQ tap-points or park devices 501 may be included that have similar hardware components. In addition, the functionality of the virtual queue system 500 may be distributed between the park devices 501 and the AW 110. In one embodiment, the central controller functionality is implemented via the virtual queue control system 502, which is remote from the attraction stations 166. Each park ride or attraction may be associated with one or more dedicated virtual attraction stations 166 that receive queue inputs from guests. That is, in certain embodiments, each attraction station 166 may facilitate entry into the virtual queue of only one attraction. One or both of the virtual queue control system 502 and the virtual queuing station 172 may include communications circuitry (e.g., communications circuitry 504 or 552), such as antennas, radio transceiver circuits, and signal processing hardware and/or software (e.g., hardware or software filters, A/D converters, multiplexers amplifiers), or a combination thereof, and that may be configured to communicate over wired or wireless communication paths via IR wireless communication, satellite communication, broadcast radio, Microwave radio, Bluetooth, Zigbee, Wifi, UHF, NFC, etc. Such communication may also include intermediate communications devices, such as radio towers. In one embodiment, the communication between the attraction station 166 and the virtual queue control system 502 is wired.

In addition, one or both of the virtual queue controller or control system 502 and the virtual queuing station 172 may include a memory device (e.g., memory device 508 or 510) for storing instructions executable by a processor (e.g., processor 512 or 514) to perform the methods and control actions described herein. For example, the processor 512 may execute instructions for dynamic virtual queue management based on inputs from the virtual queuing station 172 as well as data on guest entry into a ride and guest exit from a park. Additional inputs to dynamic queue management may include guest location within the park. For example, a reminder to return to the attraction may be based at least in part on the guest's location relative to the attraction, as determined via wireless signal or global positioning system (GPS) information from the guest active wearable or by a guest's last tap-in location with the virtual queuing station or other tap-in device. The system 500 may store guest locations during a park visit to create an accessible log of guest locations within the park for use in predicting guest current and future locations. If the guest is estimated to be located within a first distance or within a first zone relative to the attraction, the return reminder or message is sent to return within a first time (e.g., "YOU CAN LEAVE IN 20 MINUTES FOR VOLCANO RUSH"), which accounts for a shorter travel time to the attraction. If the guest is instead in a farther second zone or a farther estimated second distance, the return reminder or message accounts for the longer travel time by providing an earlier return time (e.g., "PLAN TO LEAVE IN 5 MINUTES FOR VOLCANO RUSH"), to account for longer walking times to the attraction. In this manner, guests at similar positions in the virtual queue but at different locations within the park are estimated to return to the attraction within the same approximate time window.

The processor may include one or more processing devices, and the memory may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor or by other processor-based devices (e.g., mobile devices). For example, the virtual queue control system 502 or the virtual queuing station 172 may be accessed by an operator interface 520, e.g., a computer-based workstation or a mobile device, and/or may include an input/output interface 516 and a display (e.g., display 532).

The virtual queuing station 172 or the attraction station 166 receives signals (e.g., wireless signals, such a RF signals) from a guest AW 110. The AW 110 may, in one embodiment, tap in to the virtual queuing station (e.g., via a hand wave or via positioning the AW 110 within the reading zone of the virtual queuing station 172) where it send the signal via NFC and receives signal back and updates via NFC. Additionally, components of the system (e.g., the virtual queuing station 172 and/or the AW 110) may be actively listening for a wireless broadcast and may update the display upon receipt of the appropriate broadcast. Another option is a system where the attraction stations 166 are dumb/passive and the AW 110 reads the totem location and transmits the request through a wireless network bypassing the need to have the virtual queuing station 172 read the AW 110. These signals may, in turn, be communicated to the virtual queue control system 502 to add the guest associated with the AW 110 to the virtual queue.

While the attraction station 166 may also facilitate guest entry into a virtual queue in a manner similar to the virtual queuing station 172 and may include similar components (e.g., memory 556, processor 554, communications circuitry 552), the attraction station 166 may also be implemented as an automatic gate or reader such that the AW 110 as it passes through the attraction station 166 is automatically read and the guest associated with the AW 110 is indicated as entering the ride and, therefore, is automatically removed from the virtual queue. It should be understood that certain features of the virtual queue control system 502 may additionally or alternatively be implemented locally at the attraction station 166. Further, the attraction station 166 may also include notification devices 558 such as one or more of a display, speaker, lights, to indicate successful validation of the AW 110 for ride entry.

The virtual queue system 500 may, in certain embodiments, manage a total guest experience to ensure that an individual guest may experience a minimum number of rides or experiences per day. For example, based on the virtual queue load for various attractions, the virtual queue system 500 may permit entry into a predetermined number of queues at the beginning of the day. Alternatively, the virtual queue system 500 may dynamically present ride options to each guest at a central kiosk (e.g., queue kiosk 172, see FIG. 1). That is, while in certain embodiments, the virtual queue control system is implemented without any central queue kiosk that permits selection and virtual queue entry to multiple queues of different attractions at a single device and within a single interaction, in other embodiments one or more central kiosks may mediate entry into multiple virtual queues at once.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. A method comprising:
adding a user device identification to a first virtual queue of a first attraction, wherein the first attraction is a low capacity attraction type;
adding the user device identification to a second virtual queue of a second attraction, wherein the second attraction is a high capacity attraction type different than the low capacity attraction type; and
communicating to a user device associated with the user device identification a first indication related to the first virtual queue of the first attraction and a second indication related to the second virtual queue of the second attraction.

2. The method of claim 1, wherein communicating the first indication related to the first virtual queue of the first attraction and the second indication related to the second virtual queue of the second attraction comprises:
displaying, via a display associated with the user device, a first position in the first virtual queue of the first attraction; and
displaying, via the display associated with the user device, a second position in the second virtual queue of the second attraction.

3. The method of claim 1, comprising:
receiving the user device identification from a first tap station associated with a first virtual queue station;
receiving the user device identification from a second tap station associated with a second virtual queue station; and
linking the user device identification from the first tap station or the second tap station to a user identification.

4. The method of claim 3, comprising:
acquiring, via a camera associated with the first tap station or the second tap station, an image of a user;
linking the image to the user identification; and
using the image as an entry credential for the user to enter the first virtual queue or the second virtual queue.

5. The method of claim 1, comprising:
receiving, via a service tap station, the user device identification from a signal communicator of the user device; and
coordinating reservation of a service item in response to receiving the user device identification from the service tap station.

6. The method of claim 1, comprising:
limiting addition of the user device identification to no more than one low capacity attraction type.

7. The method of claim 1, wherein the user device is a waterproof bracelet or a wearable device.

8. The method of claim 1, comprising:
determining a geographical position of a user associated with the user device identification; and
communicating to the user device associated with the user device identification the first indication and the second indication, wherein the first indication provides a first recommended time to travel to the first attraction based on the geographical position of the user, and wherein the second indication provides a second recommended time to travel to the second attraction based on the geographical position of the user.

9. A method, comprising:
receiving a first request to join a first virtual queue associated with a first attraction, wherein the first request comprises a user identification;
adding the user identification to the first virtual queue of the first attraction based on receiving the first request;
receiving a second request to join a second virtual queue associated with a second attraction, wherein the second request comprises the user identification, and wherein the second attraction is different than the first attraction;
adding the user identification to the second virtual queue of the second attraction based on receiving the second request;
determining a geographical position of a user associated with the user identification; and
communicating to a user device associated with the user a first indication related to the first virtual queue of the first attraction and a second indication related to the second virtual queue of the second attraction, wherein the first indication provides a recommended time to travel to the first attraction based on the geographical position of the user.

10. The method of claim 9, wherein receiving the first request and the second request comprises:
receiving a first signal from a signal communicator of the user device at a first tap point, wherein the first signal is indicative of a user device identification;
receiving a second signal from the signal communicator of the user device at a second tap point, wherein the second signal is indicative of the user device identification; and
linking the user device identification to the user identification.

11. The method of claim 10, comprising:
receiving the user device identification from an attraction station located proximate to the first attraction; and
validating access to the first attraction based on a position of the user device identification within the first virtual queue being less than a threshold value.

12. The method of claim 11, comprising:
receiving the user device identification from a second attraction station located proximate to the second attraction; and
validating access to the second attraction based on a second position of the user device identification within the second virtual queue being less than a second threshold value.

13. The method of claim 9, comprising:
determining a first attraction type of the first attraction, wherein the first attraction type is a low capacity attraction type;
determining a second attraction type of the second attraction, wherein the second attraction type is different than the first attraction type; and
limiting addition of the user identification to a single attraction having the low capacity attraction type.

14. The method of claim 9, comprising:
acquiring, via a camera, an image of the user;
linking the image to the user identification; and
using the image as an entry credential for the user to enter the first virtual queue or the second virtual queue.

15. The method of claim 9,
wherein the recommended time to travel is based at least in part on a first distance between the geographical position of the user and the first attraction,
and a first travel time for the user to reach the first attraction based on the first distance.

16. The method of claim 15, comprising:
communicating to the user device associated with the user identification the second indication, wherein the second indication provides an additional recommended time to travel to the second attraction based on the geographical position of the user.

17. The method of claim 16, wherein the additional recommended time to travel is based at least in part on a second distance between the geographical position of the user and the second attraction, and a second travel time for the user to reach the second attraction based on the second distance.

18. A method, comprising:
receiving a first communication from a user device, wherein the first communication comprises a first request to join a first virtual queue of a first attraction;
adding a user device identification associated with the user device to the first virtual queue in response to receiving the first communication;
receiving a second communication from the user device, wherein the second communication comprises a second request to join a second virtual queue of a second attraction, wherein the second attraction is different than the first attraction;
adding the user device identification associated with the user device to the second virtual queue in response to receiving the second communication;
determining a geographical position of a user associated with the user device; and
communicating to the user device associated with the user a first indication related to the first virtual queue of the first attraction and a second indication related to the second virtual queue of the second attraction, wherein the first indication provides a first recommended time to travel to the first attraction based on the geographical position of the user, and wherein the second indication provides a second recommended time to travel to the second attraction based on the geographical position of the user.

19. The method of claim 18, comprising:
determining a first attraction type of the first attraction, wherein the first attraction type is a low capacity attraction type;
determining a second attraction type of the second attraction, wherein the second attraction type is different than the first attraction type; and
limiting addition of the user device identification to a single attraction having the low capacity attraction type.

20. The method of claim 18,
wherein the first recommended time to travel is based at least in part on a first distance between the geographical position of the user and the first attraction and a first travel time for the user to reach the first attraction based on the first distance, and wherein the second recommended time to travel is based at least in part on a second distance between the geographical position of the user and the second attraction and a second travel time for the user to reach the second attraction based on the second distance.

* * * * *